United States Patent [19]
Jensen et al.

[11] 3,920,534
[45] Nov. 18, 1975

[54] ION EXCHANGE MEMBRANE - CATHODE CARTRIDGE FOR AN ELECTROLYTIC CELL

[75] Inventors: Gerald A. Jensen, Wayzata, Minn.; Harry N. Parsonage, Washington Township, Montgomery County, Ohio

[73] Assignee: The Mead Corporation, Dayton, Ohio

[22] Filed: Sept. 20, 1974

[21] Appl. No.: 507,731

Related U.S. Application Data

[62] Division of Ser. No. 420,699, Nov. 30, 1973, Pat. No. 3,891,532.

[52] U.S. Cl. ............... 204/282; 136/145; 204/283; 204/295; 204/296; 204/301
[51] Int. Cl.² ........................................ C25B 13/00
[58] Field of Search .......... 204/260, 282, 283, 295, 204/296, 301; 136/145

[56] References Cited
UNITED STATES PATENTS
3,849,278   11/1974   Sanders ........................... 204/260 X Primary Examiner—John H. Mack
Assistant Examiner—W. I. Solomon
Attorney, Agent, or Firm—Biebel, French & Bugg

[57] ABSTRACT

The invention is directed to an apparatus useful for performing electrolytic and electrochemical reactions. The apparatus is especially useful in cases wherein the reaction has a tendency to produce a gas, at least at the cathode. The preferred form of the apparatus is a closed concentric electrolytic cell. The apparatus includes a modular cartridge for the electrolytic cell comprising a porous tubular support member, a fiberglass mat overlying the support member, an ion exchange membrane overlying the mat, and a nylon cord wrapped around the membrane for holding the membrane and mat against the support member. The cell has a cathode concentrically disposed within the support member and an anode surrounding the modular cartridge, with the space inside of the tubular support member filled with wetproofed catalyst particles.

3 Claims, 8 Drawing Figures

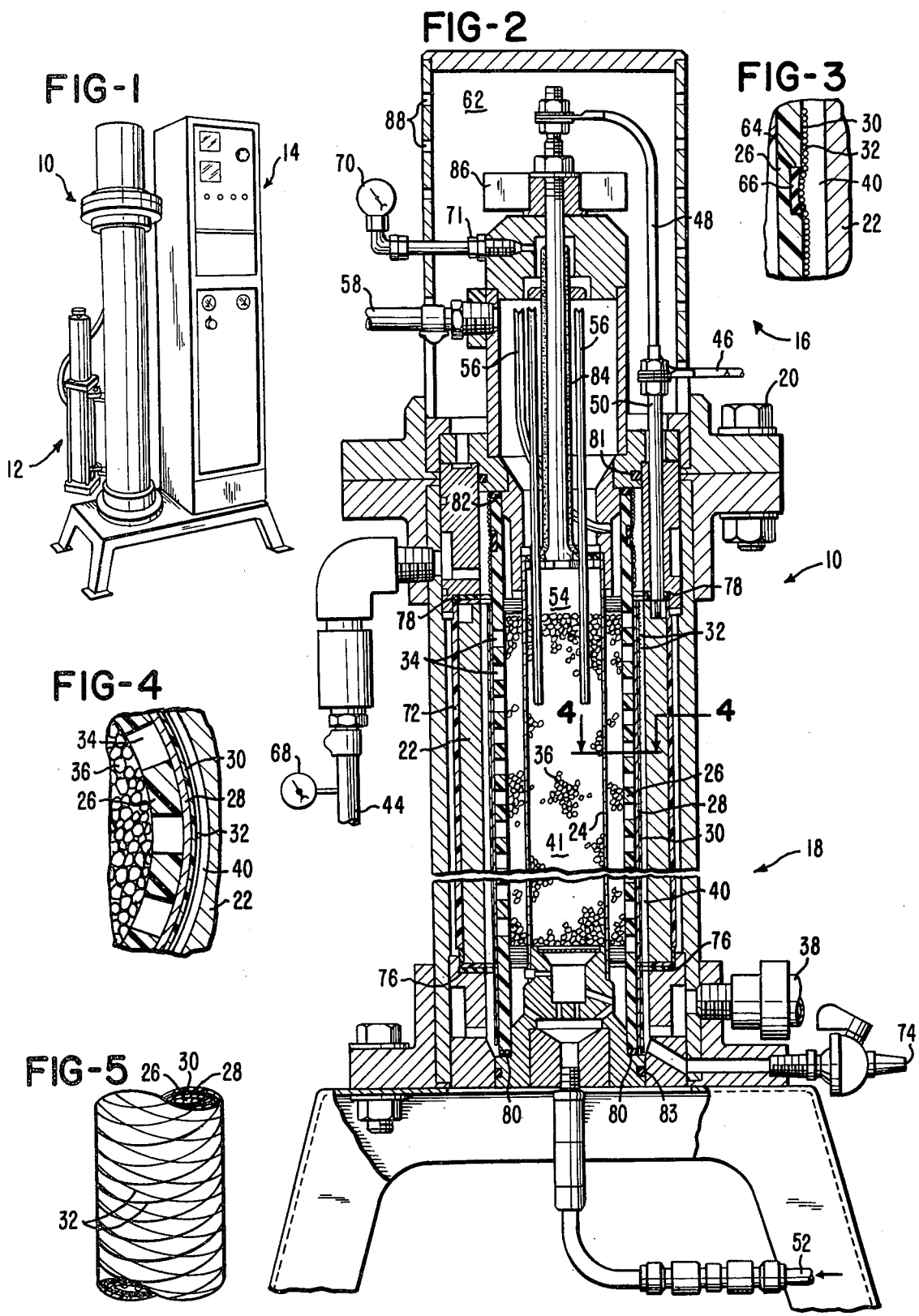

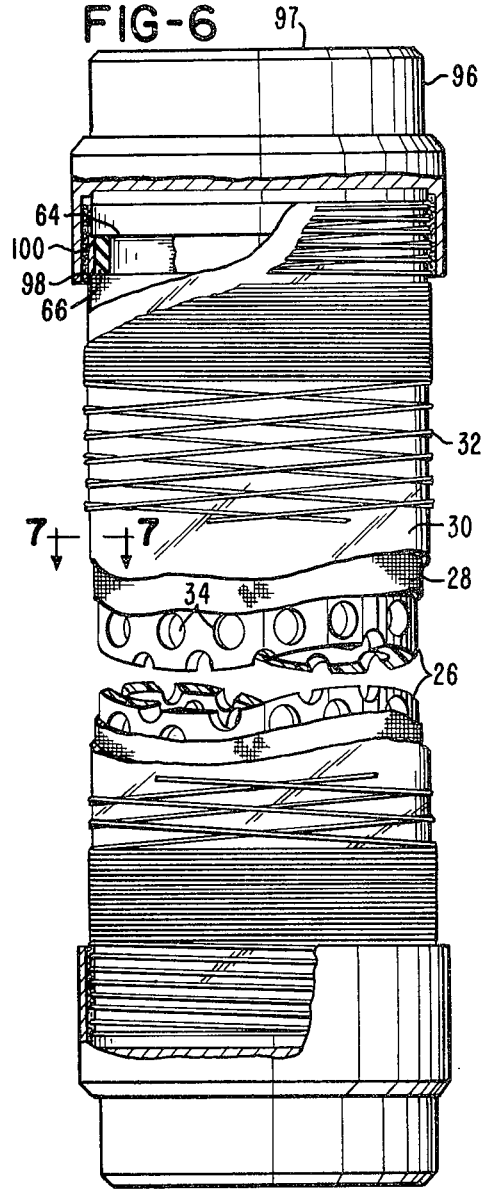
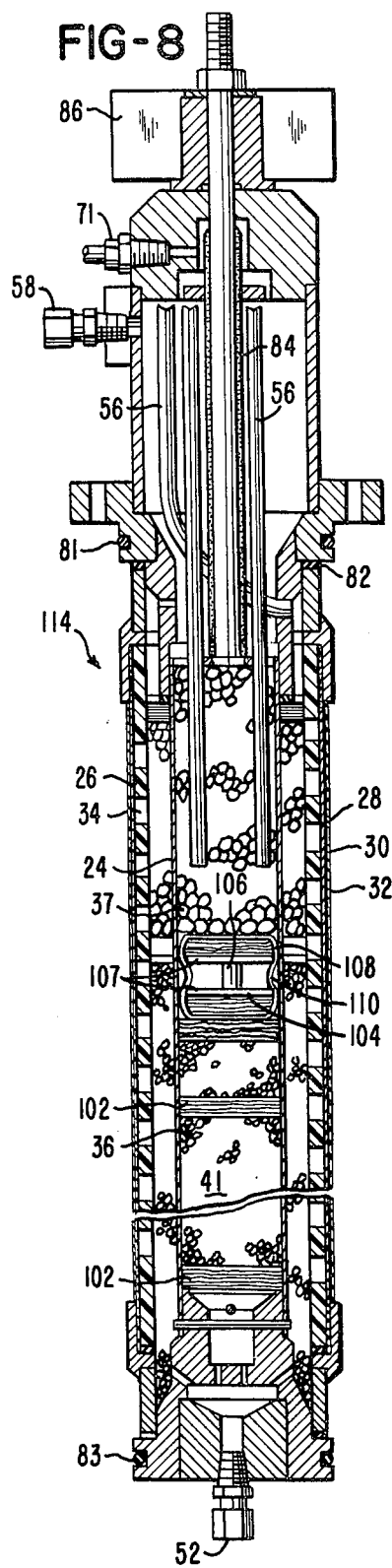
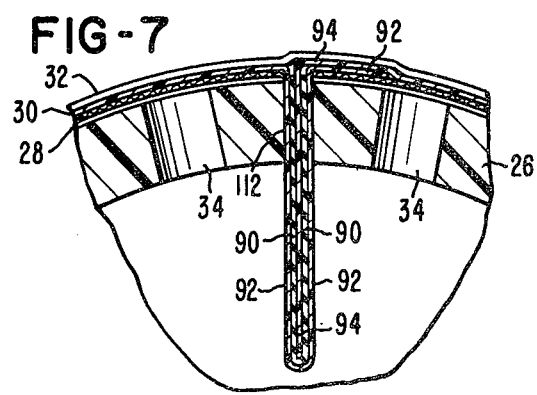

ION EXCHANGE MEMBRANE - CATHODE CARTRIDGE FOR AN ELECTROLYTIC CELL

CROSS REFERENCE TO RELATED APPLICATIONS

This application is a division of application Ser. No. 420,699, filed Nov. 30, 1973, now U.S. Pat. No. 3,891,532, and is related to and is an improvement over U.S. Patent application Ser. No. 252,285, by Frederick W. Sanders, filed May 11, 1972, now U.S. Pat. No. 3,849,278, and entitled "Improved Electrolytic System," and assigned to the same assignee as this application.

BACKGROUND OF THE INVENTION

This invention relates to apparatus useful for performing electrolytic and electrochemical reactions and related operations. The apparatus is useful in cases wherein the reaction has a tendency to produce a gas, at least at the cathode. Specifically, the present invention relates to an improved electrolytic apparatus in which gas, which tends to form at one of the electrodes, is reacted and removed, preferably in the form of an electrolytically non-interferring oxidation-reduction reaction product. Useful in the operation of the apparatus of the invention is a wetproofed catalyst which is the situs of the oxidation-reduction reaction between the gas tending to form at either electrodes and a second gas introduced and brought into contact with the wetproofed catalyst to effect a reduction-oxidation reaction of the gas formed at the electrode, or tending to form at the electrode.

Electrolytic apparatus which will perform oxidation-reduction reactions are known. Electrolytic apparatus where a gas or gases are produced at one or both of the electrodes are also known. Further, concentric electrolytic cells have been suggested. But working concentric electrolytic cells, capable of handling gas generating reactions in an efficient, effective, and safe manner, as will the apparatus of the invention, have not previously been available.

It is generally found that gas generating electrolytic cells have to be of an open construction to allow the gas or gases generated as a by-product to escape. If the cell is open, the gas will be able to dissipate in the atmosphere. If the gas is a reactive gas, such as hydrogen, there is the danger of explosion which can occur if the gas reacts with other gases in the atmosphere. If a gas such as chlorine is produced by the oxidation-reduction reaction, it cannot be allowed to pass to the atmosphere because of its danger to humans. If the cell is closed, the gas will not be able to react with or in the atmosphere, but there remains the problem of pressure build-up of the gas in the cell. Additionally, an explosive gas reaction in a closed cell is much more severe than in the open atmosphere.

Merely enclosing the cell is not necessarily the answer. The flow rates of the various liquids and gases which must pass through the cell, as well as the electricity, must be within limits which will make using a closed cell economical. If the cell is not economical, then alternatives to the electrolytic cell, or even to electrolysis, will be chosen. If the cell is large enough to be able to handle the volumes of gases, it may be too large to handle efficiently the smaller volumes of liquids being passed through the cell and being reacted. If larger volumes of liquids are used, the power requirements for the electrical potential across the electrodes may be prohibitive, and may exceed the capabilities the materials of construction which must carry the electricity. Also, because of the pressures involved and the delicacy of the ion exchange membranes used, adequate sealing is a severe problem.

As can be seen, a working, closed electrolytic cell is not a simple matter. Thus, a need exists for one capable of performing oxidation-reduction reactions efficiently, especially wherein a gas is produced at one of the electrodes.

DESCRIPTION OF THE PRIOR ART

Electrolytic processes are known in which an aqueous electrolyte is contacted by an anode and a cathode and wherein hydrogen is produced at the cathode (the electrode at which reduction takes place) while chlorine or oxygen or other gas may be formed at the anode (the electrode at which oxidation takes place). In these prior art systems, the production of one or the other of the gases at the cathode or anode presents practical problems.

U.S. Pat. No. 3,203,882 of Aug. 11, 1965, describes a bipolar chlorate cell used in the manufacture of alkali metal chlorate from alkali metal chloride solutions and wherein the cover of the cell acts as a collector for gases generated during electrolysis. The formation of hydrogen, oxygen and chlorine is said to present a problem of explosion. Reference is also made to U.S. Pat. No. 2,797,192 of June 25, 1957 and U.S. Pat. No. 3,463,722 of Aug. 26, 1969, in which the gases produced and the ratio thereof is described.

Another example of an electrolytic process of the type to which this invention applies is the production of chlorine and alkali in what is usually referred to as a "chlor-alkali" cell. In the chlor-alkali cell, the electrolyte is sodium chloride brine and chlorine gas is produced at the anode, while hydrogen gas and sodium hydroxide are produced at the cathode. The concentric anode and cathode are usually separated by a membrane or diaphragm. Canadian Pat. No. 700,933 of Dec. 29, 1964, describes such a system wherein the cathode is in the form of a porous carbon member through which air or oxygen is introduced, the purpose, according to said patent, being to effect reaction between the cathodic gas product and oxygen and thereby to convert the usual cathode to a fuel cell type cathode. Also disclosed by this Canadian patent is the use of a slurry of particulate solids in the catholyte, the slurry being freely movable in the catholyte to contact the cathode proper. When particulate solids are used in the catholyte, they may be graphite or carbon impregnated with a metal catalyst, or metal particles, the particulate material being small enough to form an aqueous slurry which when aerated allows for free and rapid contact of such particles with the cathode. In one form, the catholyte particles may be partially coated with a hydrophobic material such as tetrafluoroethylene, silicones, etc. The conductive particles are said to act as absorbents or collectors for oxygen admitted and hydrogen evolved in the cathodic portion of the cell, and are said to accept electrons upon contact with the cathode which dissipates as they move through the electrolyte with the formation of hydroxyl ions or other hydrogen-oxygen ions and ultimately water. The data presented in this Canadian patent indicates that the presence of particulate material as a slurry in the catholyte does not significantly improve the performance of the cell as compared with operation absent the slurry. Here reference is made to a comparison of 105 Ma at 1.68 v absent the slurry vs. 110 Ma at 1.8 v with the slurry present.

It is known in the art that air or oxygen may be used to depolarize the cathode. U.S. Pat. No. 3,124,520 of Mar. 10, 1964, describes a porous graphite cathode in a caustic-chlorine diaphragm cell in which air or oxygen is introduced into the porous cathode. This method of depolarization is criticized not only because of the absence of an oxygen-to-hydroxyl ion catalyst in the electrode, but because of the nature of the catholyte which is NaOH-NaCl. Thus, it is suggested that a cation exchange membrane be used to separate anolyte and catholyte in order to form NaOH in the catholyte, and that the cathode contain a catalyst. Also disclosed is a hydrogen anode, i.e., a porous anode into which hydrogen gas is introduced in order to react with the oxygen which may be released at the anode.

U.S. Pat. No. 3,218,562 of Nov. 23, 1965, also describes the "fuel cell reaction," that is, the introduction of oxygen at the cathode which is wetproofed and which has a potential applied thereto in order to effect reduction of the oxygen by acceptance of electrons and the formation of water by reaction with hydrogen ions in the catholyte. The cathode is a porous plate impregnated with platinum and wetproofed with polytetrafluoroethylene. In one form, the cell is operated as a fuel cell with a load connected between the anode and cathode and wherein the two electrodes are separated by an ion exchange membrane, olefinic gas being introduced into the anolyte. In another form the cell is electrolytic with hydrogen released at the cathode.

U.S. Pat. No. 3,147,203 of Sept. 1, 1964, which relates to the production of carbonyl compounds from olefin feed stock, describes a fuel cell system in which oxygen is introduced into the cathode and olefin fuel gas at the anode, with power being generated.

Another fuel cell arrangement is disclosed in Canadian Pat. No. 907,292, issued Aug. 15, 1972. While this patent relates mainly to the production of deuterium oxide with the aid of a catalyst having a sealing coating, there is also disclosed a hydrogen fuel cell electrode in the form of a thin sheet of an electrically conducting support material such as porous carbon with a Group VIII metal deposited thereon and coated with a silicone coating.

U.S. Pat. No. 3,216,632 describes a bipolar cell for use in electrolysis in which the bipolar electrode is vertically above the anode, with the cathode portion of the bipolar electrode facing the anode and the anode portion thereof facing the cathode electrode. Hydrogen produced at the lowermost cathode diffuses through the cathode portion of the bipolar electrode and combines with oxygen at the anode portion to form water. The hydrogen released at the cathode electrode is withdrawn.

U.S. Pat. No. 2,390,591 of Dec. 11, 1945, relating to an electrolytic system for the production of oxygen gas from a caustic alkali or acid solutions describes introducing air into a porous carbon cathode for the purpose of depolarizing the same. U.S. Pat. No. 3,143,698 of May 26, 1964, relates to a primary cell in which a tribromide is used to depolarize the cathode. Both oxidizing depolarizers (chlorine and oxygen introduced at the cathode) and reducing depolarizers (acetylene, etc., introduced at the anode) are disclosed.

Depolarization of an electrode by a gas is sometimes used to measure the concentration of the gas, see U.S. Pat. No. 3,247,452 of Apr. 19, 1966, wherein the change in voltage or current effected by depolarization is measured. Reference is also made to U.S. Pat. No. 3,258,415 of June 18, 1966, which uses a porous cathode and in which the depolarizing gas, and the gas being measured, is oxygen.

The use of electrolytic systems for the regeneration of ferricyanide-bromide bleach baths in photographic processing is known, see British Pat. No. 801,106 published Sept. 10, 1958.

Other patents of interest are: U.S. Pat. No. 524,229 of Aug. 7, 1894; U.S. Pat. Nos. 524,291 of the same date, and 530,867 of Dec. 11, 1894, all dealing with primary batteries. Also of interest is U.S. Pat. No. 2,010,608 of Aug. 6, 1935, dealing with a gas permeable carbon electrode for use in an air depolarized cell in which the electrode is impregnated with a solution of oil, paraffin, or the like.

It is known from texts (Electrochemistry, Potter MacMillan Co., New York 1956) that cathodic hydrogen evolution involves overall

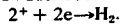

Several steps are said to be involved including:
a. Migration, diffusion or travel by convection of the hydrated hydrogen ion from the bulk liquid to the cathode;
b. A discharge, dehydration reaction in which the hydrated hydrogen ion picks up an electron from the cathode and an H atom is adsorbed on the electrode with formation of water;
c. Combination of adsorbed H atoms with release of $H_2$ gas; and
d. Reaction between the hydrated hydrogen ion, adsorbed hydrogen and an electron to form hydrogen gas.

The overpotential arising from (b), (c) and (d) is usually referred to as the activation overpotential while that from (a) is the concentration overpotential.

In depolarization, adsorbed hydrogen atoms react with oxygen to form water. There is a distinction between the hydrogen evolution reaction and the hydrogen discharge reaction as follows:

From hydrogen ions:
 (1) Evolution $\quad 2H^+ + 2e \rightarrow H_2$
 (2) Discharge $\quad 4H^+ + O_2 + 4e \rightarrow 2H_2O$
From water:
 (3) Evolution 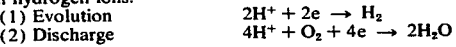
 (4) Discharge 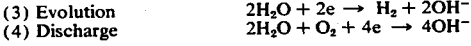

Thus, the classic depolarization reaction of the cathode involves reaction (2). Where hydrogen gas has been formed, it is usually removed as a gas. In the "fuel cell cathode", depolarization is effected by the use of air or oxygen on a porous cathode as per equation (2) supra where the hydrogen is in ionic form and adsorbed on the cathode surface.

Frequently, in addition to the depolarization reaction, excess oxygen will react with the water to produce hydroxide, as per reaction (4). This is beneficial to the operation of the cell because the hydroxide ions promote the transfer of electrons.

U.S. Patent application Ser. No. 252,285, filed May 11, 1972, entitled "Improved Electrolytic System" discloses an electrolytic and electrochemical reaction process and an apparatus useful in performing such a process especially where a gas may be produced at the cathode. The apparatus in patent application Ser. No. 252,285 consists of a cylindrical shell which defines the container and is the anode, a cylindrical cationic membrane, supported on either side by porous, i.e. with holes drilled in them, plastic sheets, spaced concentrically from the anode so as to define an annular flow space for the anolyte, e.g. ferrocyanide bleach, and a cylindrical cathode spaced further concentrically from both the anode and the membrane and surrounded by the membrane. The cylindrical space defined by the cathode and the annular space between the cathode and the membrane are filled with Contacogen (trademark of the Mead Corporation, assignee of the present invention) particles. Contacogen particles are catalyst particles which have been wetproofed by coating them with a discontinuous coating of a hydrophobic resin.

When the apparatus of Ser. No. 252,285 is in use, alkali ferrocyanide bleach is passed from the bottom of the cell, in the annular space defined by the membrane and the inside surface of the anode, to the top of the cell and out. As the bleach flows up the cell, it is regenerated from ferro to ferricyanide bleach. Cations produced by the reaction pass through the cation exchange membrane to the cathode where a further reaction produces hydrogen ions. The hydrogen ions are reacted with oxygen, in the form of air, to convert them to caustic ions and water, i.e., the cathode is depolarized, with the depolarization reaction taking place at the wetproofed catalyst particles.

Although the apparatus of the present invention can and will be used to perform the same bleach regeneration process as in Ser. No. 252,285, the concentric electrolytic cell of Ser. No. 252,285, while providing an improvement over the prior art electrolytic cells, suffers from a number of disadvantages which, while not rendering it inoperative, do render it inefficient and inconvenient.

One of the disadvantages of Ser. No. 252,285 is the fact that the full surface of the cation membrane cannot be used. Because of its delicacy and fragility, the membrane must of necessity be supported and the porous plastic sheets which surround the membrane provide that support. But, then only those areas wherein the holes occur are available for ion exchange.

A further problem is that the membrane is subject to the differences in pressure. If the fluid pressure inside the membrane is greater than the fluid pressure outside the membrane, the membrane will be forced into the holes of the porous plastic support or, if only a single inside support is used, the membrane will balloon out, away from, the support. When the membrane balloons out, it can contact the anode. If the membrane contacts the anode, it may burn out.

Another problem is that the wetproofed catalyst particles present sharp edges. In operation the wetproofed catalyst particles can work their way into the holes in the porous plastic membrane support and finally get between the support and the membrane. The sharp edges will then cause tears to occur in the membrane. Time will be lost because of the necessity to shut down the apparatus while the membrane is repaired or if unrepaired, its operation may suffer from inefficient bleach regeneration because of the leaks and improper operation of the cationic exchange membrane.

A still further problem is that the cation exchange membrane needs to be effectively sealed in order to prevent leakage between the anode and cathode chambers. Ion exchange membranes are fragile. They are readily torn or ripped, especially around their edges when trying to seal them in a closed electrolytic cell.

Still yet another problem is that the volume of air used to depolarize the cell is such that it will force the liquid, the water and/or catholyte, in the cathode chamber, out of the cell. This usually happens because the initial amount of air, travelling in slug flow, pushes the liquid out of the column, like the action of a piston.

SUMMARY OF THE INVENTION

The present invention relates to an apparatus for use in closed electrolytic systems and offers advantages over the systems of the prior art.

It solves the problems of adequately flowing the cations through the ion exchange membrane, protecting and sealing the ion exchange membranes, contacting the gas used to depolarize the cathode and the gas produced at the cathode, flowing the depolarizing gas through the cell, equalizing the pressures involved, and energizing the cell without requiring excess power consumption.

The present invention consists generally of a series of concentrically spaced cylindrical elements which elements define the flow and reaction spaces which make up the electrolytic or electrochemical reaction apparatus. There are basically three cylindrical elements which make up the concentric electrolytic cell which is the preferred embodiment of the invention. The first element is the anode, which element also can define the outer walls of the apparatus. If the anode is made from an expensive metal, e.g., stainless steel, only the minor surface need be reactive. If the anode is porous, e.g., a carbon anode, it should be rendered impervious to solution migration. In either event, the anode may be either coated with or surrounded by a less expensive metal or other material, e.g., a plastic such as polyvinyl chloride, or both. The outer layer may be in the form of an outer casing.

The second element is the ion exchange membrane and its supporting structure. This element is also cylindrical and consists of several layers. Because of its fragility and delicacy, the membranes must be supported. The preferred membrane is a cation exchange membrane — "Nafion" perfluoro sulfonic acid membrane sold by E. I. duPont de Nemours. The second element is spaced concentrically inwardly from the anode and together with the inner anode surface defines an annular flow space through which the anolyte is passed and reacted.

The third element is the cathode which is also cylindrical. It is spaced even further concentrically inward from the anode and is surrounded by the ion exchange membrane. The cathode can be stainless steel, titanium, tantalum, carbon, or the like, and will be reactive on both surfaces.

Contacogen particles, i.e., wetproofed catalyst particles, may be employed in the apparatus of the present invention. They are desirable where the apparatus is used to perform an electrolytic process which produces a gas at the cathode because they provide sites for contacting and reacting the depolarizing gas with the electrolytically produced gas. They will fill the cylindrical space defined by the cathode, as well as the annular space between the cathode and the inside of the membrane. The use of Contacogen particles to depolarize a cathode has been disclosed in U.S. patent application Ser. No. 252,285, filed May 11, 1972, and the disclosure thereof is hereby incorporated herein by reference. Basically they are a solid catalyst material such as activated carbon, titanium, platinized titanium sponge, or platinum metal, preferably in particulate form, which has been treated with a hydrophobic resin so as to form a discontinuous coating of the resin on the surface of the catalyst. In use the catalyst can be all the same, e.g., carbon, or can be a mixture or layers of different catalysts, e.g., carbon and titanium. The hydrophobic material is preferably a fluorocarbon such as polytetrafluoroethylene, although, other materials may be used. Such materials and the method of application to the catalyst particles are further disclosed in application Ser. No. 252,285 and application Ser. No. 87,503, filed Nov. 6, 1970 and now abandoned.

The support for the ion exchange membrane is generally a porous plastic cylinder. The plastic is preferably a rigid polyvinyl chloride (PVC), although any plastic is suitable as long as it is compatible with the chemicals involved and thermal conditions in which it is employed. The porosity of the plastic can be natural or created. If the plastic is to be made porous, this can be done so by, for example, drilling holes. Alternatively, the porosity can be created when the plastic tube is cast or extruded by including a pore forming ingredient such as a salt which is later melted or dissolved out, leaving the pores. Further, a porous ceramic or non-conductive metal support can be employed.

When a rigid PVC tubular support member, having holes drilled in it, is used, a fiberglass mat may also be used between the membrane and the member. The fiberglass mat is preferably a woven mat, although a non-woven or other form mat could be used. The mat has the effect of lifting the membrane, which ordinarily would be flush with the member, away from the member allowing the entire surface of the membrane to be used and not merely those areas overlying the holes. Also, when wetproofed catalyst particles are used, the mat will prevent the particles, which might pass through the holes, from puncturing the membrane. Although the use of the mat is not necessary, it is preferred since it increases the useful membrane surface area. When a porous support, which provides porosity across its entire surface, is used, the fiberglass mat could be eliminated.

The membrane and mat are preferably held in place on the porous support by a spiral wrapped cord. The preferred cord is 100 pound test nylon cord and it is wrapped in two passes, one up and one down, at approximately eight wraps per inch. The spiral wrapping will prevent the membrane from ballooning out when there is high fluid pressure inside the support member.

The end seals of the invention, i.e., the sealing of the ends of the membrane, are achieved generally by wrapping the ends of the tubular support with a cord, which is finer than that used to hold the membrane in place, e.g., 80 pound test cord, and then coating the cord and membrane with a conventional epoxy cement. The end of the support member wherein the membrane is sealed is preferably non-porous. Further, a groove can be made in the ends of the support member and a rubber insert, like a gasket, can be placed in the groove. Then, when the cord is wrapped on the end of the support, the membrane will be forced against and, to some extent, into the rubber insert. This will create an effective end seal for said membrane. In another embodiment, the ends of the membrane can be sealed using caps, e.g., plastic caps, which fit over the ends of the support member. The caps are hollow in the middle, so that they do not entirely enclose the ends of the member and so that the ends remain open. Epoxy cement can then be placed between the wall of the cap and the support member to provide the finishing seal of the ends of the membrane.

In the preferred embodiment, the anode and cathode are two inches apart concentrically, and the membrane is concentrically spaced one-quarter inch from the anode. This would be a cell having an anode being four inches in diameter, a membrane being three and one-half inches in diameter, and a cathode being two inches in diameter. This arrangement provides for maximum current density and minimum voltage, although variations can be made. Further, the preferred cell is three feet high, but variations can be made depending on the capacity requirements for the cell.

The membrane and its supporting structure, either alone or in combination with the cathode, can be pre-combined in a modular type structure for convenience of replacement. For example, the membrane, support and cathode can be joined in the form of a cartridge, which can then be filled with wetproofed catalyst particles. Then when either the membrane or wetproofed catalyst particles must be replaced, the old cartridge can be extracted and the new one installed with minimum down time in the operation of the cell.

Appropriate control means, e.g., valves and pressure gauges, can be used to equalize the pressures between the anode chamber (the space defined by outside of the membrane and the inside active surface of the anode) and the cathode chamber (the space defined by the inside of the membrane including the space inside the cathode). It has been discovered that several benefits can be achieved by having the pressure in the anode chamber be slightly greater than the cathode chamber. These benefits are that the membrane is kept tight against the support instead of ballooning out, that air does not leak out of the cathode chamber or into the anode chamber, since air in the anolyte or bleach will cause cavitation in the pumps and result in their burning out, and that the anolyte is dewatered, thus keeping up the bleach concentration, because water is carried from the anolyte across the membrane by the cations.

Finally, when the cell is initially started up, the initial amount of air, because of the large volume necessary to depolarize the cell, will flow like a plug or piston — expanding across the width of the cell — and will push all or part of the catholyte out of the cell. Without catholyte electrolysis becomes difficult. To overcome this problem, in the preferred embodiment, tubes are installed which go from the wetproofed catalyst particles to the air and by-product gas outlet. Thus, a means is provided for some of the air to by-pass the water, etc. — the catholyte — standing in the cathode chamber. Once the cell is in operation the air bubbles through the chamber, generally without further problems.

Accordingly, it is primary object of the present invention to provide a safe, convenient, closed, electrolytic or electrochemical reaction apparatus, capable of handling electrolytic reactions, especially wherein a gas may be produced at one of the electrodes.

Another object of the present invention is to provide an apparatus which is a working, closed, concentric electrolytic cell, which provides a maximum amount of electrode surface in a minimum amount of space and which keeps the current density up while keeping the voltage down.

Another object of the present invention is to provide a concentric electrolytic cell wherein full use of the ion exchange membrane is possible.

Still another object of the present invention is to provide a concentric electrolytic cell wherein the ion exchange membrane is protected from pressure differentials.

A further object of the present invention is to provide a concentric electrolytic cell, wherein the ion exchange membrane is protected from the sharp edges of the materials which provides sites for the depolarization of the cathode.

Still yet a further object of the present invention is to provide an electrolytic cell useful for the oxidation of alkali metal ferrocyanide to alkali metal ferricyanide.

Still yet another object of the present invention is to provide a modular unit which includes the cathode and cation exchange membrane for use in a concentric electrolytic cell. Other objects and advantages of the present invention will be apparent from the following description, the accompanying drawings and the appended claims.

BRIEF DESCRIPTION OF THE DRAWINGS

FIG. 1 is a schematic view of the overall electrolytic system in accordance with the present invention;

FIG. 2 is a view, partly in section and partly in elevation with portions thereof broken away, of an electrolytic cell in accordance with the present invention;

FIG. 3 is an enlarged sectional view of the end seals used in the apparatus of the present invention;

FIG. 4 is an enlarged partial cross-sectional view along lines 4—4 of FIG. 2 showing the ion exchange membrane and its supporting structure as used in apparatus of the invention;

FIG. 5 is a view, in partial elevation, of a portion of the cathode cartridge of the invention and illustrating how the membrane is held in place by spirally wrapping a nylon cord;

FIG. 6 is a view, partly in elevation and partly in cross section, of a part of the membrane support member of the invention, illustrating an alternative embodiment for sealing the ends of the membrane;

FIG. 7 is a view of a part of the cross section of the membrane support member illustrated in FIG. 6 and taken along lines 7—7 of FIG. 6 and rotated 90°;

FIG. 8 is a view, in cross section, of the modular cathode cartridge of the invention.

DESCRIPTION OF THE PREFERRED EMBODIMENT

The present invention will be described as used in a process for oxidizing alkali metal ferrocyanide to alkali metal ferricyanide.

In photographic processing a ferricyanide silver bleach is used in most color reversal processing and in some color negative processing. This is a rehalogenating process in which the ferricyanide oxidizes the metallic silver image to silver ion which, in the presence of a bromide salt such as sodium bromide, produces a water insoluble silver bromide salt. The basic reactions are:

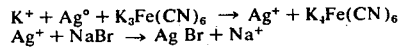
$$K^+ + Ag^° + K_3Fe(CN)_6 \rightarrow Ag^+ + K_4Fe(CN)_6$$
$$Ag^+ + NaBr \rightarrow AgBr + Na^+$$

The bleach bath is followed by a sodium thiosulfate fixing bath which forms a water soluble silver complex. As indicated, the reactions are not reversible although the buildup of ferrocyanide does not have an appreciable adverse affect on bleaching time, the latter being a function of the decrease in ferricyanide and bromide concentration. Ferricyanide is one of the more expensive inorganic chemicals used in reversal color photographic processing, and its regeneration from ferrocyanide has economic value. Some of the known regenerating schemes include oxidation by bromine, oxidation by persulfate, oxidation by ozone and peroxide oxidation. While these systems in the main are operative and have been used before, there are drawbacks, e.g., bromine vapors, excessive persulfate creates acid pH with the formation of Prussian blue and free cyanide, potential health and explosion hazards of ozone, and the high cost of peroxide oxidation.

Referring to FIG. 1, the apparatus as shown generally with electrolytic cell 10 connected to a liquid-gas entrainment separator 12, which operates to remove any liquid entrained in the gas exiting cell 10 and allows only air to pass to the atmosphere, and a control panel 14, which generally will contain the instruments used to monitor the flow of the liquids and gas through the apparatus and may include means to measure and continually monitor the ionic activity of the process stream.

FIG. 2 more clearly shows the overall concentric electrolytic cell 10. Cell 10 will generally consist of three concentric, cylindrical elements: the anode 22, the cathode 24, and the ion exchange membrane 30, with its supporting structure. These elements define the reaction surfaces and the flow spaces in the cell.

Top cover 16 and bottom cover 18 are generally cylindrical shaped and closed at one end. They are joined together at their open ends by bolts 20. Together they form a closed system serving to protect cathode 24, anode 22, and membrane 30 from dust, chemicals, the outside atmosphere, etc., as well as to define the exterior of the cell. Appropriate means (which will be explained in detail hereafter) are provided to allow for the necessary flow of fluids, gases, and electricity into and out of the cell.

Located concentrically within the walls of bottom cover 18 is anode 22. Since only the inside surface of anode 22 is usually necessary to carry on the electrolytic reactions in the cell, and since it may be necessary to render the anode impervious to solution migration, the outside surface of anode 22, which abuts against cover 18, may be coated with polyvinyl chloride 72. Any other appropriate plastic or other non-conductive material may be used, since its purpose is to render the unused outside surface of the anode inactive and, when applicable, the anode itself impervious. This also prevents loss of power and short-circuiting of the anode. As stated earlier, in the preferred embodiment the inner, active surface of anode 22 is about three square feet in surface area. This is a cylinder having an inside diameter of about four inches and being three feet high. But, the invention is not limited to these dimensions.

Spaced concentrically inward from anode 22 is ion exchange membrane 30. In the preferred embodiment the membrane is spaced about one-quarter of an inch inward from the active anode surface. Ordinarily, a cation exchange membrane will be used. As stated earlier, a preferred and particularly effective cation exchange membrane is Nafion perfluoro sulfonic acid membrane sold by E. I. duPont de Nemours, but other, known, cation exchange membranes can be used. Typically, ion exchange membranes are fragile and delicate. Because of this, it is usually necessary to provide support for their protection.

As shown in FIGS. 2, 4, and 6, membrane 30 is supported by fiberglass mat 28 and rigid polyvinyl chloride (PVC) tubular member 26. PVC member 26 is porous, with pores 34 being formed by drilling holes in said tubular member. Alternative support materials, to the PVC, can be used and these include other plastics, porous ceramic, porous non-conductive metals, and the like. Also, the pores need not be formed by drilling. They could be made by including a pore forming ingredient in the plastic material when it is shaped to form the support member.

PVC support member 26 is generally cylindrically shaped and has a slit 112 (shown in FIG. 7) which runs the length of the cylinder. When a sheet-like ion exchange membrane is used the ends of the membrane can be conveniently tucked into slit 112. Alternatively, tubular or endless ion exchange membranes can be used. When the tubular membrane is slipped over the tubular support there are no loose ends. Thus, the need for the slit is eliminated.

Fiberglass mat 28 need not be employed. But, full use of membrane 30 is achieved when mat 28 is used. Holes 34 in member 26 allow cations to pass through membrane 30. When membrane 30 is flush against member 26, only those areas of membrane 30 which overlie holes 34 are available for ion exchange. By using fiberglass mat 28, membrane 30 is lifted away from the surface of member 26, whereby the full surface area of membrane 30 is made available for ion exchange. Fiberglass mat 28 also serves to prevent membrane 30 from stretching too far into hole 34 and to prevent the wetproofed catalyst particles located within support member 28 from working their way under membrane 30 where the sharp edges of the wetproofed catalyst particles might poke holes in the membrane. Fiberglass mat 28 is preferably a woven fiberglass fabric, although other forms of fiberglass fabric and woven or nonwoven synthetic materials may be used.

When membrane 30 and mat 28 are in sheet form they are wrapped around support member 26. Their ends are inserted into slit 112 of member 26. This is best illustrated in FIG. 7 of the drawings. FIG. 7 shows a first edge 92 of membrane 30 28 into and out of slit 112 so as to form a sort of envelope. The envelope formed by edge 92 is then lined with a gasket material 90. Gasket material 90 is a soft rubber such as VITON rubber. The purpose of the rubber gasket 90 is to cushion membrane 30 and prevent contact between first edge 92 of membrane 30 and second edge 94, which is tucked into the envelope formed by edge 92. In this way, the edges 92 and 94 of membrane 30 will not abrade or tear and yet are held firmly in place.

Mat 28 and membrane 30 are also held in place on PVC member 26 by spiral wrapping with a plastic cord 32. Alternatively, metal bands could be used to hold the membrane in place but, the materials must be selected so that they will not corrode. Also, if the middle of the membrane is left unsupported, i.e., is not wrapped, high pressure inside the membrane will cause the membrane to balloon out and into contact with the anode, where it may burn.

By spirally wrapping membrane 30, ballooning problems should be overcome irregardless of how the pressure is controlled. Preferred material for cord 32 is a 100 pound test nylon cord. As shown in FIGS. 5 and 7, cord 32 is wrapped at approximately eight wraps per inch, with two passes — one up the tube at four wraps per inch and the other back down at another four wraps per inch. Other cord materials and spacings may be used as desired. Further, if the cord is wrapped wet, as it dries it will shrink and apply additional pressure to keep membrane 30 in place. As cord 32 tightens, it applies circumferential pressure, which will close slit 112 and provide additional gripping of the ends of membrane 30. The tightening of the cord, which was wet during wrapping, as it dries, also takes up any slack which may be present in the core as a result of the initial wrapping process.

Cathode 24 is located concentrically inward from membrane 30 and is surrounded by membrane 30. Both inner and outer surfaces of the cathode 24 are reactive. As stated earlier, the cathode is preferably a two inch outside diameter cylinder which is three feet high. The cathode will have about the same reactive surface area as the anode, i.e., about three square feet.

The dimensions given for the anode, cathode, membrane and their spacings are preferred in that the result is a working, closed electrolytic cell, having maximum electrode surface in a minimum space and able to keep the current density up, while keeping the voltage down. Also, caustic, i.e., hydroxyl ions, produced as a consequence of the depolarization reaction enables the power consumption to be minimized, since a low caustic level results in a higher power consumption. But, these limitations can be varied. For example, the distance between the anode and the cathode may be enlarged. Enlarging the spacing, though, results in a higher power consumption and less efficient cell. Further, the length of the cell can be varied to produce cells of varying capacity.

The inside surface of anode 22 and membrane 30 define an annular flow space or anode chamber 40 wherein the anolyte is passed. The space defined by the inside of cation membrane 30, including the space inside cathode 24 and the annular space between cathode 24 and membrane 30, is the cathode chamber 41. This space may be filled with wetproofed catalyst particles 36, e.g., Contacogen particles, to provide sites for the reaction of the hydrogen ions with oxygen to depolarize the cell, as well as for the production of caustic, when the cell is operation.

In operation, bleach is passed into the cell at inlet 38, and passes between the anode 22 and cation membrane in annular, anode chamber 40. As the bleach passes from the bottom of the cell to the top it is oxidized from ferrocyanide to ferricyanide. The alkali ferricyanide exits chamber 40 at exit 42 and flows out bleach outlet 44 to be reused in photographic processing. The bleach flow rate is generally 2–4 gallons per minute (gpm). The cell will handle a flow rate of up to 10 gpm, but, efficiency goes down.

As the bleach passes through the cell, air is pumped into cathode chamber 41 via inlet 52. Cathode chamber 41 contains catholyte, which is essentially water and caustic or hydroxide ions, and catalyst particles. As the bleach is oxidized the hydrogen which is the by-product, of the oxidation-reduction reaction, reacts on the wetproofed catalyst particle sites with the air to produce water and additional caustic. The volume of air necessary for the depolarization reaction is such that, when the cell is started up, the air flows in the form of a slug which travels up the cell and spreads to fill the entire width of cathode chamber 41. To prevent this initial air from forcing all of the fluid from the chamber (i.e., when the slug flow acts like a piston as previously described) tubes 56 some of which extend into the Contacogen bed in chamber 41 provide a by-pass allowing some of the initial air to flow past the water being pushed in front of the slug. Once the cell is in operation the air continuously introduced into the cell will bubble through the cell with no further problems.

A potential is applied across anode 22 and cathode 24 from a power source (not shown) via cable 46. Cable 46, in turn, supplies power to the anode and cathode via cables 48 and 50. Insulation 84, such as PVC or other suitable material, is provided on that part of cable 48 which extends above the cell. Insulation 84 prevents that part of the cable from inadvertently becoming a conductor and causing a cathodic reaction, since the vapor flowing past could be reacted.

As bleach is regenerated, hydrogen generated at the cathode 24 is converted to water by the reduction-oxidation reaction of the hydrogen with oxygen in the air which is bubbled through the cell. The formation of water as well as its reaction in part to form caustic occurs on wetproofed catalyst particle sites. The air is pumped into the cathode chamber 41 through inlet 52. Any unreacted air passes through the cell, to space 54, and of the cell through liquid-gas entrainment separator 12 (FIG. 1). Separator 12 removes any liquid carried by the air.

The Contacogen particles generally should not present any problems in terms of air flow through the column. On occasion, it may be desirable to pack part, e.g., the upper one-third, of the column with wetproofed platinized titanium sponge particles while the bottom two-thirds contains another type of Contacogen, i.e., wetproofed activated carbon particles. Such an arrangement is shown in FIG. 8 wherein the bottom part of the cell contains wetproofed carbon particles 36 and the top part contains wetproofed titanium particles 37. Fibrous packing may be employed to support the wetproofed catalyst particles and prevent them from shifting or settling. The fibrous packing, such as packing 102 shown in FIG. 8, can be any conventional nonwoven fabric, such as 3M Scotch Brite or a similar material. Also, a plug, such as plug 104 shown in FIG. 8, may be used to support and to separate the wetproofed titanium catalyst particles 37 from the wetproofed carbon catalyst particles 36. Plug 104 is a porous, plastic, spool-like member comprising a cylindrical core 106 and flanged ends 107 but, having holes in flanged ends 107. Additionally a fiberglass mat 108 and nylon cord 110, which holds the fiberglass in place, may be wrapped around the plug. Titanium sponge does not pack as readily as does carbon and therefore assures air flow through the upper part of the column. As mentioned previously, vent tubes may be employed to enable the initial air to by-pass the upper part of the column. In may also be desirable to intersperse porous materials, including the packing mentioned above, throughout the wetproofed carbon particles to prevent the particles from becoming packed too densely and maintain an open system through which the air can pass readily.

When the cell is operated, a great amount of heat is generated by the reaction of hydrogen and oxygen to form water, as well as by the electric resistance in cathode connector 48. Heat sink 62 is provided for the removal of the heat. Fins 86 carry the heat by conduction, from the cathode chamber, and radiate it into heat sink 62. Holes 88 in cap 87 allow air to pass through and carry the heat away from cell 10 by convection.

One embodiment of the end seals of the invention is shown in FIG. 3. A groove 64 is made around the circumference of the ends of the polyvinyl chloride tube. The ends are solid, i.e., non-porous. A rubber insert 66 is placed in groove 64. As nylon cord 32 is wrapped around membrane 30, the tension of the nylon wrap will force the membrane into the rubber insert and seal off the membrane. The nylon cord used in the seal area may be finer, e.g., 80 pound test line, than that previously described. Additionally an epoxy resin can be coated on to provide additional seal.

An alternative end seal is shown in FIG. 6. A plastic cap 96, made of PVC or a similar material, having a hollow upper end 97 is placed over the ends of membrane 30 and support 26. The ends of the membrane previously having been wrapped in the manner discussed earlier. A conventional epoxy cement is then placed between the walls 98 of the cap 96 and membrane 30 to seal the ends of the membrane.

Generally, it is not necessary nor economical to regenerate the bleach continuously. Some build up of alkali ferrocyanide can be tolerated without effecting the photographic processing. This method of operating can be achieved by allowing the bleach to flow continually through the cell at all times, while connecting and disconnecting the power in response to the ionic activity. An alternative, albeit less economical, way is to let the cell run continuously, while only flowing the bleach through the cell when regeneration is indicated as needed by an appropriate process flow controller.

The bromide ion activity in the photographic process is related to the ratio of alkali ferricyanide to alkali ferrocyanide. When the bromide activity grows low, bleach regeneration is required. Monitoring bromide activity will indicate when the bleach regenerator needs to be run. At the same time that the bleach is regenerated, fresh bleach may be added from a bleach replenisher supply. The same control can be achieved by monitoring the ratio of alkali ferrocyanide to alkali ferricyanide itself.

Copending U.S. application Ser. No. 235,116, filed Mar. 16, 1972, now U.S Pat. No. 3,770,608 and related U.S. application Ser. No. 378,025, filed July 10, 1973, both of which are assigned to the same assignee as this application, disclose apparatus to measure bromide ion activity in a photographic processing stream. When the bromide activity is low, as measured by a process controller a switch can be activated to apply voltage to the electrodes of the bleach regeneration cell. When the bromide activity is sufficiently high, the switch is deactivated. As disclosed in Ser. Nos. 235,116 and 378,025, bromide activity is monitored by immersing a pair of ion sensing probes in two solutions, one of which is a reference solution and the other is a sample of the process stream. The probes preferably employ silver bromide membranes with a pressed silver backing.

If aeration is used to depolarize the cathode, a flow sensor may be employed to shut off electrolysis if insufficient air is flowing through the cathode chamber. The system may also be interlocked to prevent electrolysis if the bleach recirculation rate drops below a prescribed level. This will eliminate the potential for over-oxidation of the bleach solution.

To insure a proper pressure on either side of membrane 30, pressure control gauges 68 and 70 (FIG. 2) can be used in association with conventional valves (not shown) to control the back pressure throughout the system. The pressure is controlled so that there is a positive, e.g., 4 psig differential, pressure within the anode chamber (for example, where the anode chamber is at 24 psig and the cathode chamber is at 20 psig). The positive anode pressure will prevent ballooning of the membrane 30, prevent air from entering the anode chamber and into the bleach solution — the air causes cavitation of the pump which is pumping bleach, with subsequent burning out of the pump — and helps to dewater the anolyte, because the positive pressure causes water to be carried from the anolyte to the catholyte across the ion exchange membrane along the cations. The dewatering is important in that dilution of the bleach solution is a factor in the need to replenish the bleach solution.

Drain 74 is provided to drain the cell of anolyte should it need to be serviced, including the replacement of the Contacogen packing, the ion exchange membrane, or the whole cathode cartridge.

Cathode 24 and ion exchange membrane 30, and its supporting structure, i.e., support member 26, fiberglass mat 28 and nylon cord wrap 30, may be combined as a modular unit, filled with Contacogen particles, such as wetproofed carbon 36 and wetproofed titanium 37. Such a modular unit is cathode cartridge 114, which is shown in FIG. 8. When the cation exchange membrane or the Contacogen particles need to be replaced, cartridge 114 need only be lifted out of cell 10 and replaced by a new cathode cartridge. Appropriate seals can be provided to render the cartridge fluid-tight. O-rings 81 and 83, as well as pressure packing 80 and 82, are provided for cathode cartridge 114. Pressure packing 76 and 78 (FIG. 2) is provided for anode 22.

The principles of the present invention may also be used in other electrochemical systems and especially where a gas is produced at one of the electrodes. The various other uses of the present invention in electrolytic systems will be readily apparent to those skilled in the art.

While the apparatus described and the method for carrying it into effect constitute preferred embodiments of the present invention, it is to be understood that the invention is not limited to this apparatus and method and that changes may be made in either without departing from the scope of the invention which is defined in the appended claims.

What is claimed is:

1. A modular cartridge for use in an apparatus for conducting an electrolytic chemical reaction comprising
   a porous, synthetic plastic, tubular support member,
   a woven fiberglass mat, overlying the exterior surface of said support member,
   an ion exchange membrane overlying said fiberglass mat, and
   a nylon cord wrapped around said membrane, mat and member and holding said membrane and mat in position against said member.

2. The modular cartridge of claim 1 further including a cathode, inwardly and concentrically spaced from said support member.

3. The modular cartridge of claim 2 wherein the space defined by the inner surface of said support member is filled with wetproofed catalyst particles.

* * * * *